(12) United States Patent
Kim et al.

(10) Patent No.: US 7,244,531 B2
(45) Date of Patent: Jul. 17, 2007

(54) NON-AQUEOUS ELECTROLYTE AND LITHIUM BATTERY USING THE SAME

(75) Inventors: Han-su Kim, Seoul (KR); Ju-yup Kim, Seoul (KR); Seok-soo Lee, Kyungki-do (KR)

(73) Assignee: Samsung SDI Co., Ltd., Suwon, Kyungki-do (KR)

( * ) Notice: Subject to any disclaimer, the term of this patent is extended or adjusted under 35 U.S.C. 154(b) by 187 days.

(21) Appl. No.: 10/631,761

(22) Filed: Aug. 1, 2003

(65) Prior Publication Data

US 2004/0096737 A1  May 20, 2004

(30) Foreign Application Priority Data

Nov. 16, 2002  (KR) .................. 10-2002-0071396

(51) Int. Cl.
*H01M 10/08* (2006.01)

(52) U.S. Cl. .................. 429/302; 429/199; 252/62.2

(58) Field of Classification Search ................ 429/304, 429/344, 302
See application file for complete search history.

(56) References Cited

U.S. PATENT DOCUMENTS

| 4,828,369 | A | * | 5/1989 | Hotomi ................ 359/270 |
| 5,830,600 | A | * | 11/1998 | Narang et al. ............ 429/199 |
| 5,961,672 | A | | 10/1999 | Skotheim et al. |
| 6,017,651 | A | | 1/2000 | Nimon et al. |
| 6,025,094 | A | | 2/2000 | Visco et al. |

(Continued)

FOREIGN PATENT DOCUMENTS

EP  1037293  9/2000

(Continued)

OTHER PUBLICATIONS

Masashi Ishikawa et al., In Situ Scanning Vibrating Electrode Technique for Lithium Metal Anodes, Journal of Power Sources, 1997, pp. 501-505, vol. 68, Elsevier Science S.A., Lausanne, Switzerland.

(Continued)

*Primary Examiner*—Mark Ruthkosky
(74) *Attorney, Agent, or Firm*—Buchanan, Ingersoll & Rooney PC

(57) ABSTRACT

A non-aqueous electrolyte for stabilizing the active surface of a lithium anode and a lithium battery using the non-aqueous electrolyte are provided. The non-aqueous electrolyte contains an organic solvent and a halogenated organic metal salt of formula (1) below:

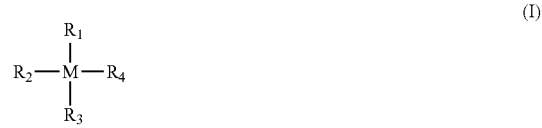

where M is one of Si, Sn, Pb, and Ge; $R_1$ is one of F, Cl, Br, and I; $R_2$ is a substituted or unsubstituted $C_1$-$C_{20}$ alkyl group or a substituted or unsubstituted phenyl group; and $R_3$ and $R_4$ are independently selected from the group consisting of F, Cl, Br, I, a substituted or unsubstituted $C_1$-$C_{20}$ alkyl group, and a substituted or unsubstituted phenyl group.

18 Claims, 4 Drawing Sheets

U.S. PATENT DOCUMENTS

| | | |
|---|---|---|
| 6,165,644 A | 12/2000 | Nimon et al. |
| 6,225,002 B1 | 5/2001 | Nimon et al. |
| 6,277,525 B1 * | 8/2001 | Yamamoto et al. ......... 429/326 |
| 6,358,643 B1 | 3/2002 | Katz et al. |
| 6,379,846 B1 * | 4/2002 | Terahara et al. ............ 429/344 |
| 6,416,906 B1 * | 7/2002 | Smith et al. ................ 429/304 |

FOREIGN PATENT DOCUMENTS

| | | | |
|---|---|---|---|
| JP | 04206273 | * | 7/1992 |
| JP | 08-064028 | | 3/1996 |
| JP | 11-162508 | | 6/1999 |
| JP | 2000-058120 | | 2/2000 |
| JP | 2001-283908 | | 10/2001 |
| JP | 2002-008716 | | 1/2002 |
| JP | 2002-033127 | | 1/2002 |
| JP | 2002-083633 | | 3/2002 |
| JP | 2004-171981 | | 6/2004 |

OTHER PUBLICATIONS

Masashi Ishikawa et al., Electrochemical Control of a Li Metal Anode Interface: Improvement of Li Cyclability by Inorganic Additives Compatible With Electrolytes, Journal of Electroanalytical Chemistry, 1999, pp. 279-284, vol. 473, Elsevier Science S.A., Lausanne, Switzerland.

Yoshiharu Matsuda, Behavior of Lithium/Electrolyte Interface in Organic Solutions, Journal of Power Sources, 1993, pp. 1-7, vol. 43-44, Elsevier Sequoia, Lausanne, Switzerland.

* cited by examiner

NON-AQUEOUS ELECTROLYTE AND LITHIUM BATTERY USING THE SAME

BACKGROUND OF THE INVENTION

This application claims priority from Korean Patent Application No. 2002-71396, filed on Nov. 16, 2002, in the Korean Intellectual Property Office, the disclosure of which is incorporated herein in its entirety by reference.

1. Field of the Invention

The present invention relates to a lithium battery, and more particularly, to a lithium battery with an anode containing lithium metal.

2. Description of the Related Art

Lithium metal available as an anode active material for electrochemical batteries theoretically has a high energy density of about 3,860 mAh/g. However, a longer lifespan is not ensured to a secondary battery with a lithium anode. This is the reason why secondary batteries using a lithium anode are not commercially available yet.

In a lithium secondary battery using a lithium anode, the repeated charging-discharging cycles lead to the growth of dendrites on the lithium metal anode, which causes internal short-circuit of the battery, and the formation of mossy dead lithium crystals on the anode, which reduces the capacity of the lithium metal anode. Due to these problems, it is difficult for secondary batteries using a lithium anode to obtain a longer lifespan.

The formation of dendrites and/or dead lithium on a lithium anode during repeated charging-discharging cycles is known to be caused mainly by the interaction between the lithium metal and an electrolyte. In this regard, many attempts to solve these problems have been tried in a variety of aspects in the field.

U.S. Pat. Nos. 5,961,672; 6,017,651, and 6,025,094 disclose methods of forming a protective film on the surface of a lithium anode to prevent the lithium anode from contacting an electrolyte.

Matsuda et al. discloses a method for reducing the reactivity of a lithium anode with an electrolyte, in which metallic ions derived from, for example, Ga, Mg, In, etc., are added into the electrolyte so that a lithium alloy is formed on the surface of the lithium anode after interaction between the anode and the electrolyte [Y. Matsuda, J. Power Sources, 43, 1 (1993); Y. Matsuda et al., J. Power Sources, 68, 501 (1997); Y. Matsuda et al., J. Electroanal Chem, 473, 279 (1999)].

Japanese Patent Laid-open Publication No. 2000-58120, U.S. Pat. Nos. 6,017,651 and 6,165,644 disclose methods of adding an inorganic metal salt producing positive ions of metals, such as Al, Mg, Sn, Ga, and In, that form an alloy with lithium, and negative ions, such as $I^-$, $Cl^-$, and $ClO_4^-$, into an electrolyte.

SUMMARY OF THE INVENTION

The present invention provides a non-aqueous electrolyte for stabilizing the active surface of a lithium anode and a lithium battery using the non-aqueous electrolyte.

In accordance with an aspect of the present invention, there is provided a non-aqueous electrolyte comprising: an organic solvent; and a halogenated organic metal salt of formula (1) below:

where M is one of Si, Sn, Pb, and Ge; $R_1$ is one of F, Cl, Br, and I; $R_2$ is a substituted or unsubstituted $C_1$-$C_{20}$ alkyl group or a substituted or unsubstituted phenyl group; and $R_3$ and $R_4$ are independently selected from the group consisting of F, Cl, Br, I, a substituted or unsubstituted $C_1$-$C_{20}$ alkyl group, and a substituted or unsubstituted phenyl group.

In accordance with another aspect of the present invention, there is provided a lithium battery comprising: a lithium anode; a cathode containing a cathode active material which intercalates or binds to lithium; a separator interposed between the cathode and the anode; and the above-described non-aqueous electrolyte.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

A non-aqueous electrolyte according to the present invention includes an organic solvent and a halogenated organic metal salt of formula (1) above. The halogenated organic metal salt dissociates in the electrolyte into halogen anions and cations in the form of $R_xM^{(4-x)+}$ where R is alkyl or phenyl and x is an integer from 1 to 3. The cations form a lithium alloy through a reaction with lithium metal at the surface of a lithium anode, according to the following mechanism:

where a and b are arbitrary positive integers and c=a+b(4-x).

The lithium alloy formed on the surface of a lithium anode, which has the formula of $Li_a[R_xM]_b$, serves as a kind of protective coating to prevent a reaction between lithium metal and the electrolyte and to stabilize the active surface of the lithium anode. As a result, the formation of lithium metal dendrites and/or dead lithium metal crystals on the surface of the lithium anode is suppressed. Therefore, the non-aqueous electrolyte according to the present invention improves the charging-discharging efficiency and the lifespan of secondary batteries having a lithium anode. In addition, more reliable primary batteries can be manufactured using the non-aqueous electrolyte according to the present invention due to its effect of stabilizing the surface of the lithium anode.

Suitable alkyl groups for $R_2$, $R_3$, and $R_4$ of a halogenated organic metal salt of formula (1) above include substituted or unsubstituted $C_1$-$C_{20}$ straight or branched alkyl groups, and preferably substituted or unsubstituted $C_1$-$C_{12}$ straight or branched alkyl groups, and more preferably substituted or unsubstituted $C_1$-$C_6$ straight or branched alkyl groups. Specified examples of such alkyl groups include, but are not limited to, a methyl group, an ethyl group, a n-propyl group, an isopropyl group, a n-butyl group, an iso-butyl group, a sec-butyl group, a t-butyl group, a pentyl group, an iso-amyl group, and a hexyl group.

Examples of a halogenated organic metal salt of formula (1) above include, but are not limited to, triphenylsilyl chloride, triphenyltin chloride, triphenyllead chloride, triphenylgermanium chloride, triphenylsilyl bromide, triphenylsilyl fluoride, trimethylsilyl chloride, trimethyltin chloride, trimethyllead chloride, trimethylgermanium chloride, dimethyltin dichloride, di-tert-butyltin dichloride, and a mixture of the forgoing salts.

Preferred halogenated organic metal salts include chlorinated organic metal salts and fluorinated organic metal salts, which are more likely to dissociate into ions than other halogens, and halogen ions from which combine with lithium to form a protective coating film that blocks dendric growth.

In the non-aqueous electrolyte according to the present invention, if the concentration of halogenated organic metal salt of formula (1) above is too small, the effect of extending the battery lifespan is trivial. The lifespan extending effect becomes greater with increasing concentration of halogenated organic metal salt. However, if the concentration of halogenated organic metal salt exceeds a certain level, the lifespan extending effects tends to decrease. In view of this, it is preferable that the concentration of halogenated organic metal salt is in a range of, preferably, about 10-5,000 ppm, and more preferably, about 500-2,500 ppm.

Any organic solvent which can dissolve the halogenated organic metal salts and lithium salt can be used for the non-aqueous electrolyte according to the present invention without limitations. Suitable organic solvents may be single-component organic solvents or multi-component organic solvents. An organic solvent having a large dielectric constant, low viscosity, and small reactivity to lithium metal is preferable. Such an organic solvent having a large dielectric constant and low viscosity makes ionic dissociation and conduction easier. An alternative multi-component organic solvent may be a mixture of a high-dielectric, high-viscosity organic solvent and a low-dielectric, low-viscosity organic solvent.

Examples of suitable organic solvents useful in the present invention are disclosed in U.S. Pat. Nos. 6,165,644; 6,225,002; and 6,358,643. Specified examples of organic solvents include, but are not limited to, sulfolane, dimethyl sulfone, dialkyl carbonates, tetrahydrofuran (THF), propylene carbonate (PC), ethylene carbonate (EC), dimethyl carbonate (DMC), butyrolactone, N-methylpyrrolidinone, 1,3-dimethyl-2-imidizolidinone, and a mixture of the forgoing solvents.

Suitable organic solvents useful in the present invention include donor solvents which tend to solvate cations, for example, hexamethylphosphoramide (HMPA), pyridine, N,N-diethylacetamide, N,N-diethylformamide, dimethylsulfoxide (DMSO), tetramethylurea, N,N-dimethylacetamide, N,N-dimethylformamide (DMF), tributylphosphate, trimethylphosphate, N,N,N',N'-tetraethylsulfamide, tetramethylenediamine, tetramethylpropylenediamine, pentamethyldiethylenetriamine, and a mixture of the forgoing solvents.

Suitable organic solvents useful in the present invention include acceptor solvents which tend to solvate anions, for example; alcohols, such as methanol; glycols, such as ethylene glycol; polyglycols, such as polyethylene glycol; nitromethane; trifluoroacetic acid; trifluoromethanesulfonic acid; boron trifluoride; and a mixture of the forgoing solvents.

Suitable organic solvents useful in the present invention also include dioxolanes, more particularly 1,3-dioxolane, 4,5-diethyldioxolane, 4,5-dimethyldioxolane, 4-methyl-1,3-dioxolane, 4-ethyl-1,3-dioxolane, and a mixture of the forgoing solvents.

Another examples of suitable organic solvent useful in the present invention include at least one ether compound of the formula of $R_1(CH_2CH_2O)_nR_2$ where n is an integer from 1 to 10; $R_1$ and $R_2$ are independently a substituted or unsubstituted alkyl group or a substituted or unsubstituted alkoxy group. $R_1$ and $R_2$ may form a cyclic structure together to give a crown ether. Examples of straight ether compounds include glymes of the formula of $CH_3O(CH_2CH_2O)_nCH_3$, glyme oxides of the formula of $(CH_2CH_2O)_n(CH_2O)_p$ where p ranges from 1 to 50, etc. Specified examples of ether compounds include, but are not limited to, dimethoxyethane (DME, called "glyme"), bis(2-methoxyethyl)ether (DGM, called "diglyme"), etc.

The non-aqueous electrolyte according to the present invention need not initially contain a lithium salt. For example, in lithium sulfur batteries that use sulfur as a cathode active material, lithium sulfide or lithium polysulfide generated in a cathode during discharging dissolves in the electrolyte and acts as a lithium salt. Therefore, there is no need to add a lithium salt into the non-aqueous electrolyte according to the present invention. Such a reaction product from a cathode that is dissolved in an electrolyte is called "catholyte".

A non-aqueous electrolyte according to an embodiment of the present invention may further comprise a lithium salt. This non-aqueous electrolyte is applicable to lithium sulfur batteries as well as lithium ion batteries. However, the non-aqueous electrolyte according to the present invention, which further contains an additional lithium salt, is preferable for lithium ion batteries that use, for example, lithium composite oxide, as a cathode active material.

Any lithium salt can be used in the present invention without limitations. However, a lithium salt having low lattice energy, large degree of dissociation, thermal stability, and oxidation resistance is preferable. A larger degree of dissociation of lithium salt leads to a greater ionic conductivity of electrolyte.

Specified examples of lithium salts useful in the present invention include, but are not limited to, $LiPF_6$, $LiClO_4$, $LiAsF_6$, $LiBF_4$, $LiCF_3SO_3$, $LiN(CF_3SO_2)_2$, $LiSCN$, and $LiC(CF_3SO_2)_3$, which may be used alone or in combination.

In the non-aqueous electrolyte according to the present invention, if the concentration of lithium salt is too low, the ionic conductivity of the non-aqueous electrolyte becomes too small. If the concentration of lithium salt is too high, excess lithium salt remains undissolved without enhancing the ionic conductivity. In view of this, it is preferable that the concentration of lithium salt is in a range of about 0.4-1.5 M.

A non-aqueous electrolyte according to the present invention is applicable to any kind of lithium battery, including lithium primary batteries, lithium secondary batteries, and lithium gel-polymer batteries. In particular, it is preferable to use the non-aqueous electrolyte according to the present invention in lithium secondary batteries using a lithium anode. It is more preferable to use the non-aqueous electrolyte according to the present invention in lithium sulfur secondary batteries using a lithium anode and a sulfur-containing cathode.

The present invention provides a lithium battery comprising: a lithium anode, a cathode containing a cathode active material which intercalates or bind to lithium; a separator interposed between the anode and the cathode; and a non-aqueous electrolyte containing a halogenated organic metallic salt of formula (1) above in an organic solvent.

Regarding the lithium battery according to the present invention, the term "lithium anode" refers to an anode containing lithium metal in at least a region of the surface, as described above. In other words, the lithium anode may contain lithium metal, a lithium metal alloy, a lithium-inert sulfur composite material, and lithium-intercalated carbon as an active material. When the non-aqueous electrolyte according to the present invention is applied to such a lithium anode, the active surface of the lithium anode is stabilized, and the formation and growth of dendrites and/or dead lithium on the surface of the lithium anode are suppressed. The lithium anode may additionally have a protective film on its surface that is able to conduct lithium ions and is stable to the electrolyte.

In an embodiment of the lithium battery according to the present invention, a cathode active material which irreversibly intercalates or binds to lithium may be used for primary lithium batteries.

In another embodiment of the lithium battery according to the present invention, a cathode active material which reversibly intercalates or binds to lithium may be used for primary or secondary lithium batteries. Throughout the specification of the present invention, the cathode active material which reversibly intercalates or binds to lithium is referred to as "reversible cathode active material". Examples of a reversible cathode active material include a lithium-containing metal oxide, such as $Li_xCoO_2$, $Li_xMn_2O_4$, or $Li_xNiO_2$ where $0<x<1$, and a sulfur-containing material selected from elemental sulfur, solid $Li_2S_x$ where $x \geq 1$, a catholyte containing dissolved $Li_2S_x$ where $x \geq 1$, organosulfur, $(C_2S_x)_y$ where x ranges from 2.5 to 50 and $y \geq 2$, and a mixture of the foregoing sulfur-containing materials.

For the separator of a lithium battery according to the present invention, a porous polymer film which is stable to the electrolyte may be used. Examples of the suitable porous polymer film include a porous polyethylene film, a porous polypropylene film, a multi-layered film including the foregoing two porous films, etc.

The non-aqueous electrolyte for a lithium battery according to the present invention contains an organic solvent and a halogenated organic metal salt of formula (1) above, as described above. The halogenated organic metal salt suppresses the formation of lithium metal dendrites and/or dead lithium on the surface of the lithium anode. The non-aqueous electrolyte may further contain a lithium salt. Examples of the halogenated organic metal salt of formula (1) above, the organic solvent, and the lithium salt and their composition are the same as described above.

The non-aqueous electrolyte for a lithium battery according to the present invention may be socked into a gel-polymer matrix. In this case, the non-aqueous electrolyte may further comprise a polymerizable or cross-linkable monomer, prepolymer, or a mixture thereof, and a polymerization initiator generating radicals by heat or light irradiation. The non-aqueous electrolyte is changed into gel form after the assembly of a battery.

The lithium battery according to the present invention can be manufactured by methods common in the field, which are disclosed in many references. Thus, a detailed description thereon will be omitted here.

Hereinafter, the present invention will be described in greater detail with reference to the following examples. The following examples are for illustrative purposes and are not intended to limit the scope of the present invention. It will be understood by those of ordinary skill in the art that various changes may be made based on the above-description and the following examples within the spirit and scope of the present invention as defined by the claims.

EXAMPLE 1

Use of Triphenylsilyl Chloride

Example 1-1

A non-aqueous electrolyte containing about 500 ppm of triphenylsilyl chloride as a halogenated organic metal salt and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

The resulting coin cell was subjected to repeated charging/discharging cycles to determine the number of charging/discharging cycles, n, for 0% discharging efficiency. The lithium cycling efficiency was calculated using the n value from the following equation: Lithium cycling efficiency (%)=(1−9/n)×100.

As a result, the n value was 112, and the lithium cycling efficiency was 92%.

Example 1-2

A 2016 coin cell was manufactured in the same manner as in Example 1-1, except that 1,000 ppm of triphenylsilyl chloride was used. The n value was 180, and the lithium cycling efficiency was 95%.

Example 1-3

A 2016 coin cell was manufactured in the same manner as in Example 1-1, except that 2,500 ppm of triphenylsilyl chloride was used. The n value was 120, and the lithium cycling efficiency was 92.5%.

Example 1-4

A 2016 coin cell was manufactured in the same manner as in Example 1-1, except that 5,000 ppm of triphenylsilyl chloride was used. The n value was 96, and the lithium cycling efficiency was 90.6%.

EXAMPLE 2

Use of Di-tert-butyltin Dichloride

Example 2-1

A non-aqueous electrolyte containing about 500 ppm of di-tert-butyltin dichloride as a halogenated organic metal salt and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

As a result of repeated charging/discharging cycles, the n value of the coin cell was 76, and the lithium cycling efficiency was 88.2%.

Example 2-2

A 2016 coin cell was manufactured in the same manner as in Example 2-1, except that 1,000 ppm of di-tert-butyltin dichloride was used. The n value was 102, and the lithium cycling efficiency was 91.2%.

Example 2-3

A 2016 coin cell was manufactured in the same manner as in Example 2-1, except that 2,500 ppm of di-tert-butyltin dichloride was used. The n value was 78, and the lithium cycling efficiency was 88.6%.

Example 2-4

A 2016 coin cell was manufactured in the same manner as in Example 2-1, except that 5,000 ppm of di-tert-butyltin dichloride was used. The n value was 57, and the lithium cycling efficiency was 84.1%.

EXAMPLE 3

Use of Trimethyltin Chloride

Example 3-1

A non-aqueous electrolyte containing about 500 ppm of trimethyltin chloride as a halogenated organic metal salt and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

As a result of repeated charging/discharging cycles, the n value of the coin cell was 92, and the lithium cycling efficiency was 90.2%.

Example 3-2

A 2016 coin cell was manufactured in the same manner as in Example 3-1, except that 1,000 ppm of trimethyltin chloride was used. The n value was 115, and the lithium cycling efficiency was 92.2%.

Example 3-3

A 2016 coin cell was manufactured in the same manner as in Example 3-1, except that 2,500 ppm of trimethyltin chloride was used. The n value was 82, and the lithium cycling efficiency was 89%.

Example 3-4

A 2016 coin cell was manufactured in the same manner as in Example 3-1, except that 5,000 ppm of trimethyltin chloride was used. The n value was 48, and the lithium cycling efficiency was 81.2%.

EXAMPLE 4

Manufacture of a Lithium Sulfur Battery

A non-aqueous electrolyte containing about 1,000 ppm of triphenylsilyl chloride as a halogenated organic metal salt and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A pouched lithium sulfur battery was manufactured using the non-aqueous electrolyte, an anode containing lithium metal as its active material, a cathode containing elemental sulfur as its active material, and a polyethylene separator (available from Ashai).

Figure 4:
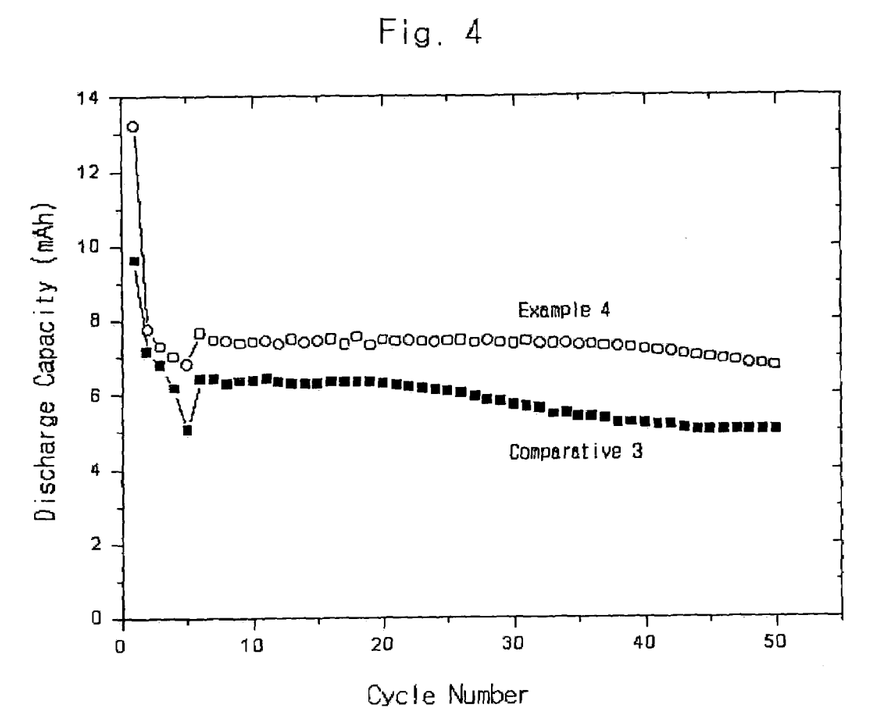
FIG. 4 is a comparative graph of discharge capacity for lithium sulfur batteries, one of which contains an organic metal salt and the other does not.

Discharge capacity with respect to the number of charging/discharging cycles was measured using the lithium sulfur battery. The results are shown in FIG. 4.

COMPARATIVE EXAMPLE 1

No Addition of a Halogenated Organic Metal Salt

A non-aqueous electrolyte containing about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

As a result of repeated charging/discharging cycles, the n value of the coin cell was 31, and the lithium cycling efficiency was 71%.

COMPARATIVE EXAMPLE 2

Addition of an Inorganic Metal Salt

Various kinds of inorganic metal salts were added in place of a halogenerated organic metal salt, and the charging/discharging cycle characteristics were measured.

COMPARATIVE EXAMPLE 2-1

Use of $SnI_2$

A non-aqueous electrolyte containing about 2,000 ppm of $SnI_2$ and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

As a result of repeated charging/discharging cycles, the n value of the coin cell was 79, and the lithium cycling efficiency was 88.6%.

COMPARATIVE EXAMPLE 2-2

Use of $MgI_2$

A non-aqueous electrolyte containing about 2,000 ppm of $MgI_2$ and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

As a result of repeated charging/discharging cycles, the n value of the coin cell was 84, and the lithium cycling efficiency was 89.3%.

COMPARATIVE EXAMPLE 2-3

Use of $AlI_3$

A non-aqueous electrolyte containing about 2,000 ppm of aluminum iodide ($AlI_3$) and about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A 2016 coin cell was manufactured using the non-aqueous electrolyte, a lithium metal cathode, a lithium metal anode, and a polyethylene separator (available from Ashai).

As a result of repeated charging/discharging cycles, the n value of the coin cell was 114, and the lithium cycling efficiency was 92.1%.

COMPARATIVE EXAMPLE 3

Manufacture of a Lithium Sulfur Battery

A non-aqueous electrolyte containing about 1M $LiN(SO_2CF_3)_2$ as a lithium salt in a multi-component organic solvent containing dioxolane (DOX), diglyme (DGM), dimethoxyethane (DME), and sulfolane (SUL) in a ratio of 5:2:2:1 by weight was prepared.

A pouched lithium sulfur battery was manufactured using the non-aqueous electrolyte, an anode containing lithium metal as its active material, a cathode containing elemental sulfur as its active material, and a polyethylene separator (available from Ashai).

Discharge capacity with respect to the number of charging/discharging cycles was measured using the lithium sulfur battery. The results are shown in FIG. 4.

Result 1: Concentration of Triphenylsilyl Chloride

The results of Comparative Example 1 and Examples 1-1 through 1-4 are shown in Table 1 below and FIG. 1.

TABLE 1

| Concentration of triphenylsilyl chloride (ppm) | n value | Lithium cycling efficiency (%) |
|---|---|---|
| 0 | 31 | 71 |
| 500 | 112 | 92 |

TABLE 1-continued

| Concentration of triphenylsilyl chloride (ppm) | n value | Lithium cycling efficiency (%) |
|---|---|---|
| 1,000 | 180 | 95 |
| 2,500 | 120 | 92.5 |
| 5,000 | 96 | 90.6 |

As shown in Table 1 above, the n value and the lithium cycling efficiency are much greater in the cases of triphenylsilyl chloride being added than in the case of no triphenylsily chloride being added.

Figure 1:
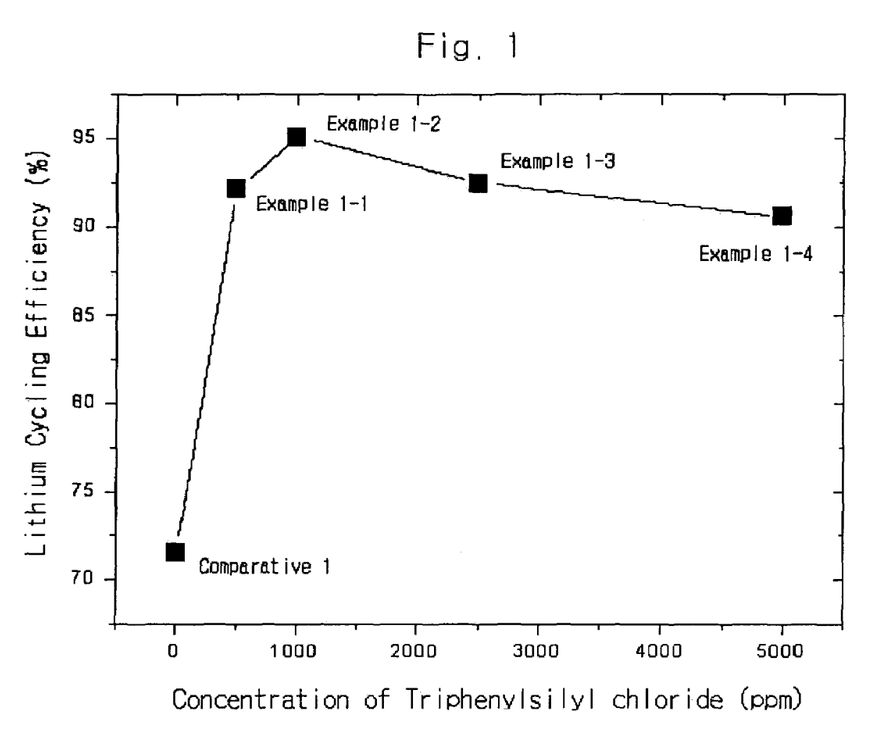
FIG. 1 is a graph of change in the lithium cycling efficiency of coin cells with respect to triphenylsilyl chloride concentration in their non-aqueous electrolyte according to the present invention.

However, as is also apparent from FIG. 1, the lithium cycling efficiency tends to decrease when the concentration of triphenylsilyl chloride exceeds a certain level. In conclusion, it is preferable that triphenylsily chloride as a halogenated organic metal salt is added in a concentration of, preferably, about 10-5,000 ppm, more preferably about 500-2,500 ppm.

Result 2: Concentration of Di-tert-butyltin Dichloride

The results of Comparative Example 1 and Examples 2-1 through 2-4 are shown in Table 2 below and FIG. 2.

TABLE 2

| Concentration of di-tert-butyltin dichloride (ppm) | n value | Lithium cycling efficiency (%) |
|---|---|---|
| 0 | 31 | 71 |
| 500 | 76 | 88.2 |
| 1,000 | 102 | 91.2 |
| 2,500 | 78 | 88.6 |
| 5,000 | 57 | 84.1 |

As shown in Table 2 above, the n value and the lithium cycling efficiency are much greater in the cases of di-tert-butyltin dichloride being added than in the case of no di-tert-butyltin dichloride being added.

Figure 2:
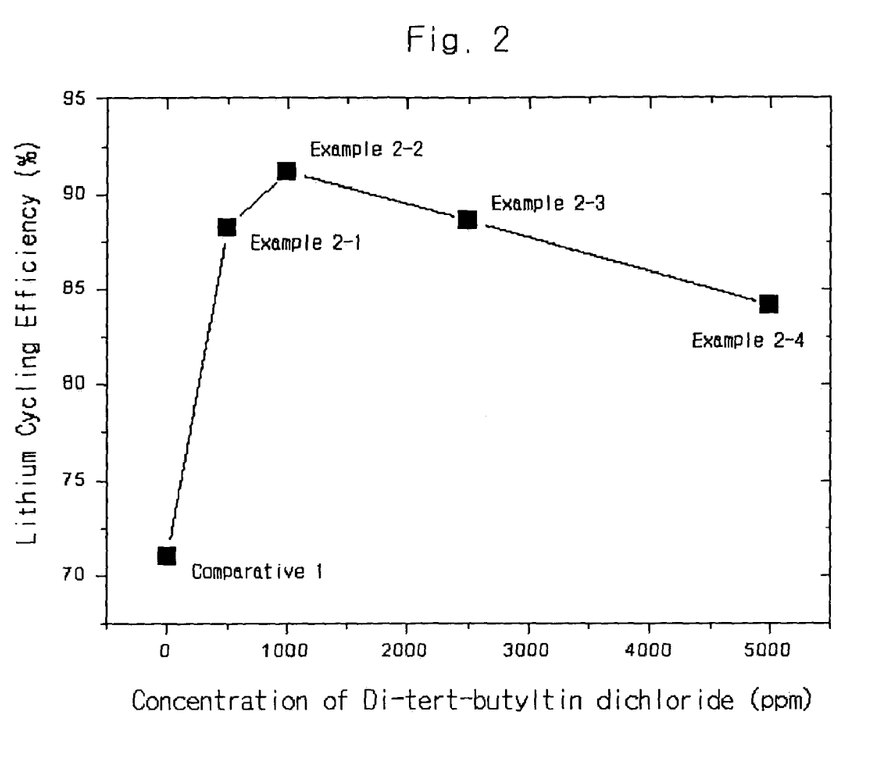
FIG. 2 is a graph of change in the lithium cycling efficiency of coin cells with respect to di-tert-butyltin dichloride concentration in their non-aqueous electrolyte according to the present invention.

However, as is also apparent from FIG. 2, the lithium cycling efficiency tends to decrease when the concentration of di-tert-butyltin dichloride exceeds a certain level. In conclusion, it is preferable that di-tert-butyltin dichloride as a halogenated organic metal salt is added in a concentration of, preferably, about 10-5,000 ppm, more preferably about 500-2,500 ppm.

Result 3: Concentration of Trimethyltin Chloride

The results of Comparative Example 1 and Examples 3-1 through 3-4 are shown in Table 3 below and FIG. 3.

TABLE 3

| Concentration of trimethyltin chloride (ppm) | n value | Lithium cycling efficiency (%) |
|---|---|---|
| 0 | 31 | 71.0 |
| 500 | 92 | 90.2 |
| 1,000 | 115 | 92.2 |
| 2,500 | 82 | 89.0 |
| 5,000 | 48 | 81.2 |

As shown in Table 3 above, the n value and the lithium cycling efficiency are much greater in the cases of trimethyltin chloride being added than in the case of no trimethyltin chloride being added.

Figure 3:
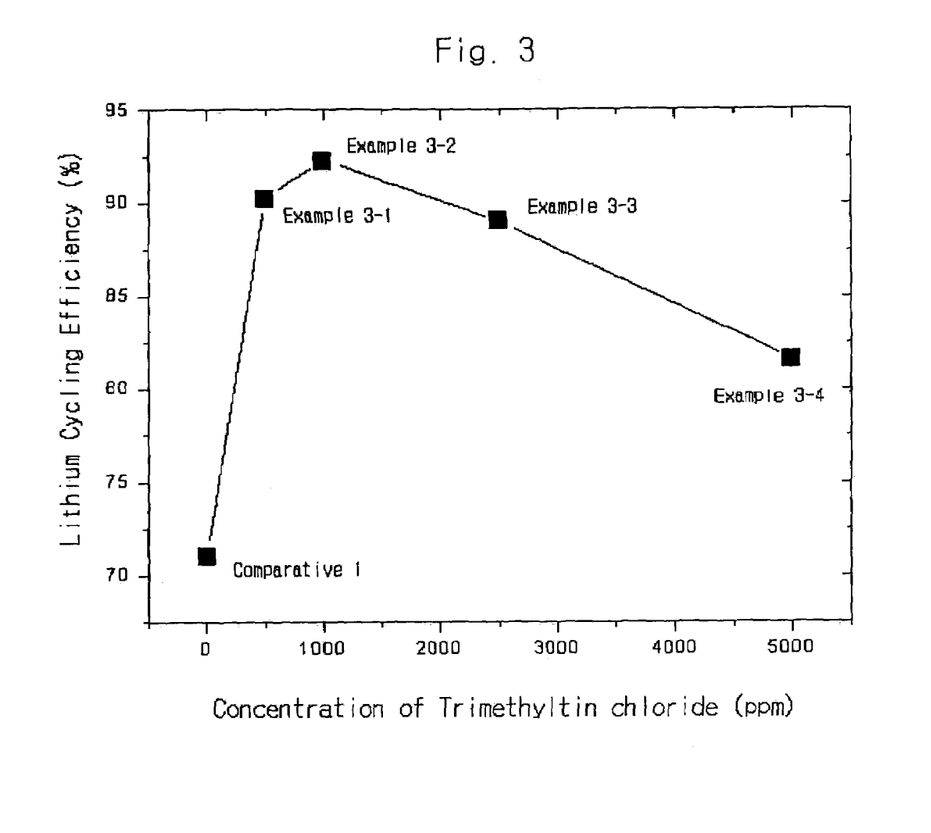
FIG. 3 is a graph of change in the lithium cycling efficiency of coin cells with respect to trimethyltin chloride concentration in their non-aqueous electrolyte according to the present invention.

However, as is also apparent from FIG. 3, the lithium cycling efficiency tends to decrease when the concentration of trimethyltin chloride exceeds a certain level. In conclusion, it is preferable that trimethyltin chloride as a halogenated organic metal salt is added in a concentration of, preferably, about 10-5,000 ppm, more preferably about 500-2,500 ppm.

Result 4: Inorganic Metal Salt Versus Halogenated Organic Metal Salt

The results of Example 1-2 and Comparative Examples 2-1 through 2-3 are shown in Table 4 below.

TABLE 4

| Metal salt | n value | Lithium cycling efficiency (%) |
|---|---|---|
| Triphenylsilyl chloride 1,000 ppm (Example 1-2) | 180 | 95.0 |
| SnI$_2$ 2,000 ppm (Comparative Example 2-1) | 79 | 88.6 |
| MgI$_2$ 2,000 ppm (Comparative Example 2-2) | 84 | 89.3 |
| AlI$_3$ 2,000 ppm (Comparative Example 2-3) | 114 | 92.1 |

As shown in Table 4 above, the n value and the lithium cycling efficiency are much greater in the case of the halonegated organic metal salt being added than in the cases of the inorganic salts being added, indicating the greater effect of the non-aqueous electrolyte containing the halogenated organic metal salt that extends the lifespan of the lithium anode, compared to ones containing the inorganic metal salts.

Result 5: Lithium Sulfur Battery Performance

The results of Example 4 and Comparative Example 3 are shown in FIG. 4.

As is apparent from FIG. 4, the discharge capacity of the lithium sulfur battery of Example 4, which contains the triphenylsilyl chloride-containing non-aqueous electrolyte, is maintained to be greater than the discharge capacity of the lithium sulfur battery of Comparative Example 3, which does not contain a halogenated organic metal salt in its electrolyte, throughout the repeated charging/discharging cycles. This result indicates that the charging/discharging efficiency and the lifespan of batteries can be improved by using the halogenerated organic metal salt-containing non-aqueous electrolyte according to the present invention.

As described above, a non-aqueous electrolyte according to the present invention containing a halogenated organic metal salt of formula (1) above forms a lithium alloy of the formula of Li$_a$[R$_x$M]$_b$ on the active surface of a lithium anode to stabilize it. This lithium alloy acts as a kind of protective coating preventing the lithium metal on the anode surface from reacting with the electrolyte. Therefore, the non-aqueous electrolyte according to the present invention suppresses the generation of lithium metal dendrites and/or dead lithium on the surface of the lithium anode and thus improves the charging/discharging efficiency and the lifespan when used in secondary batteries having a lithium anode. More reliable primary batteries can be manufactured using the non-aqueous electrolyte according to the present invention due to the effect of stabilizing the active surface of the lithium anode.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A non-aqueous electrolyte for use in a lithium battery having a lithium anode comprising:
   an organic solvent; and
   a halogenated organic metal salt of formula (1) below:

(I)

where M is one of Si, Sn, Pb, and Ge; R$_1$ is one of F, Cl, Br, and I; R$_2$ is a substituted or unsubstituted C$_1$-C$_{20}$ alkyl group or a substituted or unsubstituted phenyl group; and R$_3$ and R$_4$ are independently selected from the group consisting of F, Cl, Br, I, a substituted or unsubstituted C$_1$-C$_{20}$ alkyl group, and a substituted or unsubstituted phenyl group,
   wherein during use in a lithium battery said halogenated organic metal salt dissociates into halogen anions and into cations which form a protective lithium alloy at the surface of the lithium anode through a reaction with lithium metal at the surface of the lithium anode, wherein a concentration of the halogenated organic metal salt is 500-2,500 ppm.

2. The non-aqueous electrolyte of claim 1, wherein the halogenated organic metal salt of said formula (1) is selected from the group consisting of triphenylsilyl chloride, triphenyltin chloride, triphenyllead chloride, triphenylgermanium chloride, triphenylsilyl bromide, triphenylsilyl fluoride, trimethylsilyl chloride, trimethyltin chloride, trimethyllead chloride, trimethylgermanium chloride, dimethyltin dichloride, di-tert-butyltin dichloride, and a mixture of the forgoing metal salts.

3. The non-aqueous electrolyte of claim 1, further comprising a lithium salt.

4. A lithium battery comprising:
   a lithium anode;
   a cathode containing a cathode active material which intercalates or binds to lithium;
   a separator interposed between the cathode and the anode; and
   a non-aqueous electrolyte containing an organic solvent and a halogenated organic metal salt of formula (1) below:

(I)

where M is one of Si, Sn, Pb, and Ge; R$_1$ is one of F, Cl, Br, and I; R$_2$ is a substituted or unsubstituted C$_1$-C$_{20}$ alkyl group or a substituted or unsubstituted phenyl group; and R$_3$ and R$_4$ are independently selected from the group consisting of F, Cl, Br, I, a substituted or unsubstituted C$_1$-C$_{20}$ alkyl group, and a substituted or unsubstituted phenyl group, and wherein during the use of said battery said halogenated organic metal salt dissociates into halogen anions and into cations which form a protective lithium alloy at the surface of said lithium anode through a reaction with lithium metal at the surface of said lithium anode, wherein a concentration of the halogenated organic metal salt is 500-2,500 ppm.

5. The lithium battery of claim 4, wherein the lithium anode comprising a material selected from the group consisting of a lithium metal, a lithium metal alloy, a lithium-inert sulfur composite material, a lithium-intercalated carbon, and a mixture of the forgoing materials.

6. The lithium battery of claim 4, wherein the cathode active material is at least one lithium-containing metal oxide selected from the group consisting of $Li_xCoO_2$, $Li_xMn_2O_4$ and $Li_xNiO_2$ where $0<x<1$.

7. The lithium battery of claim 4, wherein the cathode active material is at least one sulfur-containing material selected from the group consisting of elemental sulfur, solid $Li_2S_x$ where $x \geq 1$, a catholyte containing dissolved $Li_2S_x$ where $x \geq 1$, organo-sulfur, $(C_2S_x)_y$ where x ranges from 2.5 to 50 and $y \geq 2$, and a mixture of the foregoing materials.

8. The lithium battery of claim 4, wherein the halogenated organic metal salt of said formula (1) is selected from the group consisting of triphenylsilyl chloride, triphenyltin chloride, triphenyllead chloride, triphenylgermanium chloride, triphenylsilyl bromide, triphenylsilyl fluoride, trimethylsilyl chloride, trimethyltin chloride, trimethyllead chloride, trimethylgermanium chloride, dimethyltin dichloride, di-tert-butyltin dichioride, and a mixture of the forgoing metal salts.

9. The lithium battery of claim 4, wherein the non-aqueous electrolyte further comprise a lithium salt.

10. The lithium battery of claim 4, wherein the non-aqueous electrolyte is soaked into a gel-polymer matrix.

11. The non-aqueous electrolyte of claim 1, wherein the halogenated organic metal salt is present in an amount of 5000 ppm or less and comprises one of the following triphenylsilyl chloride, di-tert-butyltin chloride, or trimethyltin chloride.

12. The non-aqueous electrolyte of claim 11, wherein the organic solvent is a multi-component organic solvent comprising dioxolane (DOX), diglyme (DGM), dimethoxyethane (DME), and sulfolane (SUL).

13. The non-aqueous electrolyte of claim 11, wherein the halogenated organic metal salt is present in an amount between 500-1000 ppm.

14. The non-aqueous electrolyte of claim 3, wherein the lithium salt comprises $LiN(SO_2CF_3)_2$.

15. The non-aqueous electrolyte of claim 4, wherein the halogenated organic metal salt is present in an amount of 5000 ppm or less and comprises one of the following triphenylsilyl chloride, di-tert-butyltin chloride, or trimethyltin chloride.

16. The non-aqueous electrolyte of claim 15, wherein the organic solvent is a multi-component organic solvent comprising dioxolane (DOX), diglyme (DGM), dimethoxyethane (DME), and sulfolane (SUL).

17. The non-aqueous electrolyte of claim 15, wherein the halogenated organic metal salt is present in an amount between 500-1000 ppm.

18. The non-aqueous electrolyte of claim 9, wherein the lithium salt comprises $LiN(SO_2CF_3)_2$.

* * * * *